(12) United States Patent
Mollano

(10) Patent No.: US 12,402,738 B2
(45) Date of Patent: Sep. 2, 2025

(54) TONG WITH ONE-HANDED LOCKING MECHANISM

(71) Applicant: Maurizio Mollano, Santa Barbara, CA (US)

(72) Inventor: Maurizio Mollano, Santa Barbara, CA (US)

( * ) Notice: Subject to any disclaimer, the term of this patent is extended or adjusted under 35 U.S.C. 154(b) by 0 days.

(21) Appl. No.: 18/627,880

(22) Filed: Apr. 5, 2024

(65) Prior Publication Data

US 2024/0245242 A1      Jul. 25, 2024

Related U.S. Application Data

(63) Continuation of application No. PCT/US2022/076661, filed on Sep. 29, 2022, which is a continuation of application No. 17/495,567, filed on Oct. 6, 2021, now Pat. No. 11,974,682.

(51) Int. Cl.
*A47G 21/10* (2006.01)
*A47J 43/28* (2006.01)

(52) U.S. Cl.
CPC ............ *A47G 21/10* (2013.01); *A47J 43/283* (2013.01)

(58) Field of Classification Search
CPC ...... A47G 21/10; A47G 21/106; A47J 43/283
USPC ....................................................... 294/99.2
See application file for complete search history.

(56) References Cited

U.S. PATENT DOCUMENTS

| | | | |
|---|---|---|---|
| 2,082,062 A | 6/1937 | Johnson | |
| 2,652,832 A | 9/1953 | Castroviejo | |
| 2,864,645 A | 12/1958 | Meldrum | |
| 3,140,715 A | 7/1964 | Whitton, Jr. et al. | |
| 3,934,915 A | 1/1976 | Humpa | |
| 4,727,876 A | 3/1988 | Porat | |
| 5,876,420 A | 3/1999 | Noll | |
| 6,056,338 A | 5/2000 | Kerr | |
| 6,092,847 A | 7/2000 | Kwan | |
| 6,536,819 B2 | 3/2003 | Wang | |
| 6,644,868 B2 | 11/2003 | De Marchi | |
| 6,869,117 B1 | 3/2005 | Blum | |
| 7,086,676 B2 | 8/2006 | Sumter et al. | |

(Continued)

FOREIGN PATENT DOCUMENTS

| | | |
|---|---|---|
| CN | 205697029 U | 11/2016 |
| DE | 3705570 C1 | 3/1988 |

(Continued)

OTHER PUBLICATIONS

Grainger, "LAMP Grab Catch: Acetal, Black Acetal, 1 29/64 in Catch/Latch Ht, 1 7/16 in Catch/Latch Wd", https://www.grainger.com/product/LAMP-Grab-Catch-Acetal-5ENU1?opr=PDPRRDSP&analytics=dsrrltems_5ENW3, printed Jan. 20, 2023, 2 pages.

(Continued)

*Primary Examiner* — Paul T Chin
(74) *Attorney, Agent, or Firm* — Cislo & Thomas, LLP

(57) ABSTRACT

A tong with a lock that can be actuated using one hand without changing a grip on the tong and without having to change an orientation of the tong. The lock can be engaged and disengaged by squeezing arms of the tong together. The lock can have a latch on one arm and a strike on the other arm. When the arms are squeezed together the strike engages the latch into a locked configuration. From the locked configuration, when the arms are squeezed again, the latch releases the strike.

8 Claims, 5 Drawing Sheets

(56) References Cited

U.S. PATENT DOCUMENTS

| | | | |
|---|---|---|---|
| 8,308,208 | B1 | 11/2012 | Blum |
| 8,562,045 | B2 | 10/2013 | Lv |
| 8,714,606 | B2 | 5/2014 | Schoeman |
| 9,072,409 | B2 | 7/2015 | Audet |
| 10,004,360 | B1 | 6/2018 | Rose et al. |
| 10,485,365 | B1 | 11/2019 | van Dalen |
| 11,974,682 | B2 * | 5/2024 | Mollano ................ A47G 21/10 |
| 2004/0254604 | A1 | 12/2004 | Viart et al. |
| 2008/0179903 | A1 | 7/2008 | Tardif |
| 2009/0284031 | A1 | 11/2009 | Pavicsits et al. |
| 2014/0319862 | A1 | 10/2014 | Ho et al. |
| 2020/0281382 | A1 * | 9/2020 | Siskindovich ........ A47J 43/283 |

FOREIGN PATENT DOCUMENTS

| | | |
|---|---|---|
| JP | 3151159 U | 6/2009 |
| WO | 2017052513 A1 | 3/2017 |

OTHER PUBLICATIONS

Sugatsune, https://www.sugatsune.com/product/non-magnetic-mini-touch-latch-3/, 1 page.

* cited by examiner

TONG WITH ONE-HANDED LOCKING MECHANISM

CROSS REFERENCE TO RELATED APPLICATIONS

This patent application is a continuation of PCT Application No. PCT/US2022/076661 filed on Sep. 29, 2022, which is a continuation of U.S. patent application Ser. No. 17/495,567, filed Oct. 6, 2021, which applications are incorporated in their entirety here by this reference.

TECHNICAL FIELD

This invention relates to tongs, such as those used in in cooking.

BACKGROUND

Tongs are a very common cooking utensil used in the kitchen and at barbeques allowing the cook to pick up food items without being too close to the heat. The tong allows the cook to add food into the hot cooking area, flip foods, remove food, and the like. Generally, the tong has two arms connected by a spring-loaded hinge at one end allowing the free end to be squeezed to grasp the food item.

Oftentimes it is convenient to have the tong arms locked in place, particularly, in the closed configuration. The most popular locking mechanism is the use of a pull tab located at the hinge where the first arm is connected to the second arm. In order to lock the tong in the closed configuration, the cook closes the tong with one hand and pulls on the tab with a free hand. To unlock the tong, the cook holds the tong in one hand and pushes the tab back towards the hinge. Thus, this common locking mechanism requires both hands to lock and unlock the tong arms. Other locks require the user to shift his or her grip to access the lock.

To overcome the need for two hands or shifting grips to lock and unlock the tong arms, another popular mechanism is the use of a gravity-based lock. With the gravity-based locks, the user squeezes the tongs together and the user holds the distal ends upward or downward to allow gravity to pull the lock into a locked or unlocked configuration. These tongs require the added motion of changing the orientation of the tongs, which may not always be desirable. For example, if there are liquids, oils, or sauces on the distal end of the tong, the user may not want to hold the distal end upward and allow the liquid, oil, or sauce to drip towards the hinge.

For the foregoing reasons there is a need for a tong that can be locked or unlocked with a single hand, without changing the grip on the tong, and without having to change the orientation of the tong.

DISCLOSURE OF INVENTION

The present invention is directed to a tong that can be locked or unlocked with a single hand, without changing the grip on the tong, and without having to change the orientation of the tong. The tong utilizes a locking mechanism positioned on the interior surface of the arms that can lock together simply by squeezing the arms together, and unlock simply by squeezing the arms together.

MODES OF CARRYING OUT THE INVENTION

Figure 1:
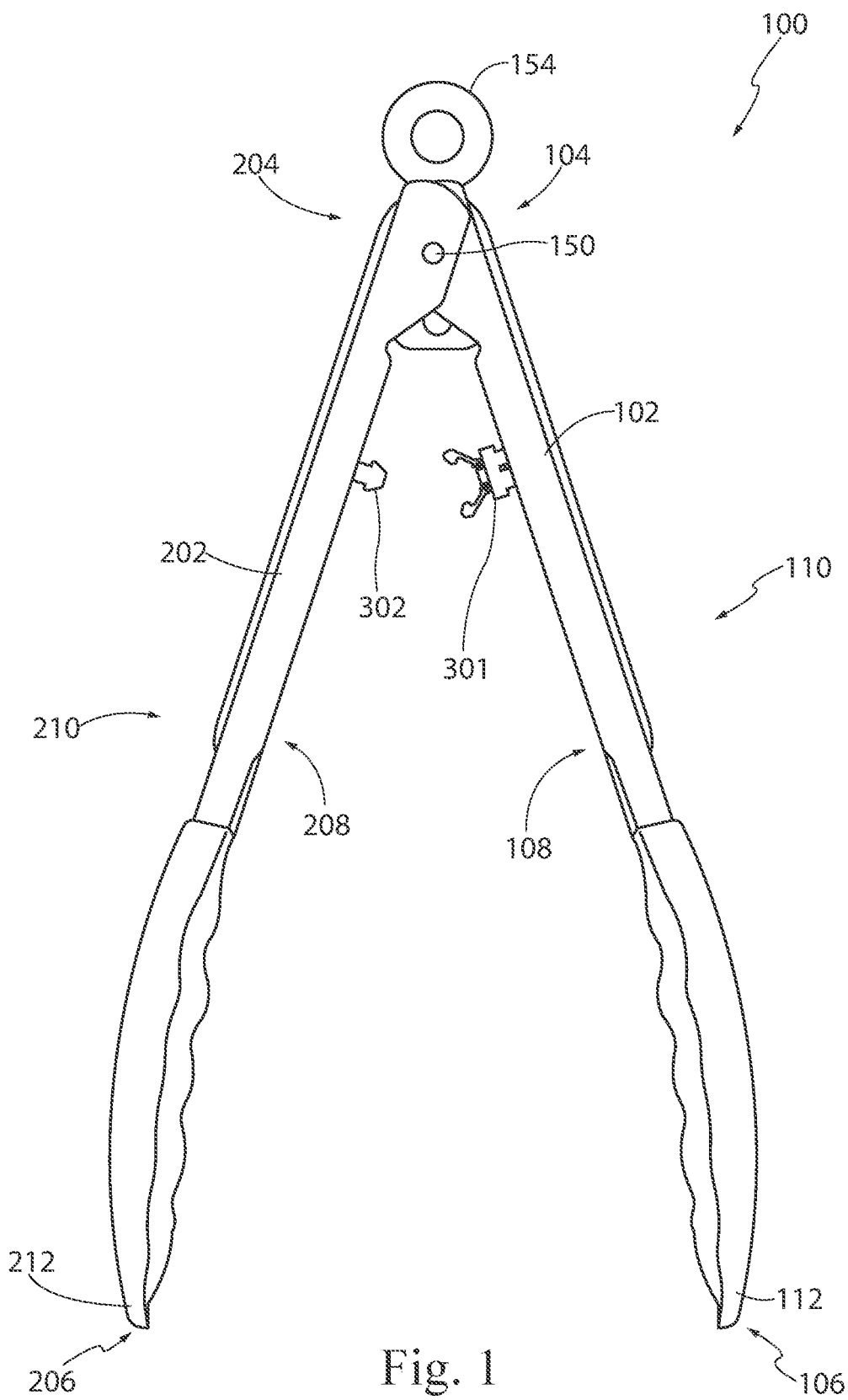
FIG. 1 shows a side elevation view of an embodiment of the present invention in the open and unlocked configuration.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

With reference to FIGS. 1-5, the invention of the present invention is a tong 100 having two arms 102, 202, and a lock 300 that can be engaged to lock the arms 102, 202 in place, and disengaged to allow the arms 102, 202 to move, with one hand and without having to move the user's finger positioning or change the orientation of the tong 100, simply by squeezing the arms 102, 202 together. As such, the user can use the tong 100 as intended, and when the user wants to lock the arms 102, 202, the user can simply squeeze the tong 100 with nothing in between the arms 102, 202, and disengage the lock, again without adjusting the user's grips or changing the tong 100 orientation, simply by squeezing the arms 102, 202 together. Thus, the same action (squeezing the arms 102, 202) for locking the arms 102, 202 is the same action for unlocking the arms 102, 202.

The tong 100 comprises a first arm 102 having a first proximal end 104, a first distal end 106 opposite the first proximal end 104, a first inner surface 108 in between the first proximal end 104 and the first distal end 106, and a first outer surface 110 opposite the first inner surface 108 and in between the first proximal end 104 and the first distal end 106. The tong 100 also comprises a second arm 202 having a second proximal end 204, a second distal end 206 opposite the second proximal end 204, a second inner surface 208 in between the second proximal end 204 and the second distal end 206, and a second outer surface 210 opposite the second inner surface 208 and in between the second proximal end 204 and the second distal end 206. The first arm 102 is connected to the second arm 202 by a hinge 150 at the first and second proximal ends 104, 204.

Figure 3:
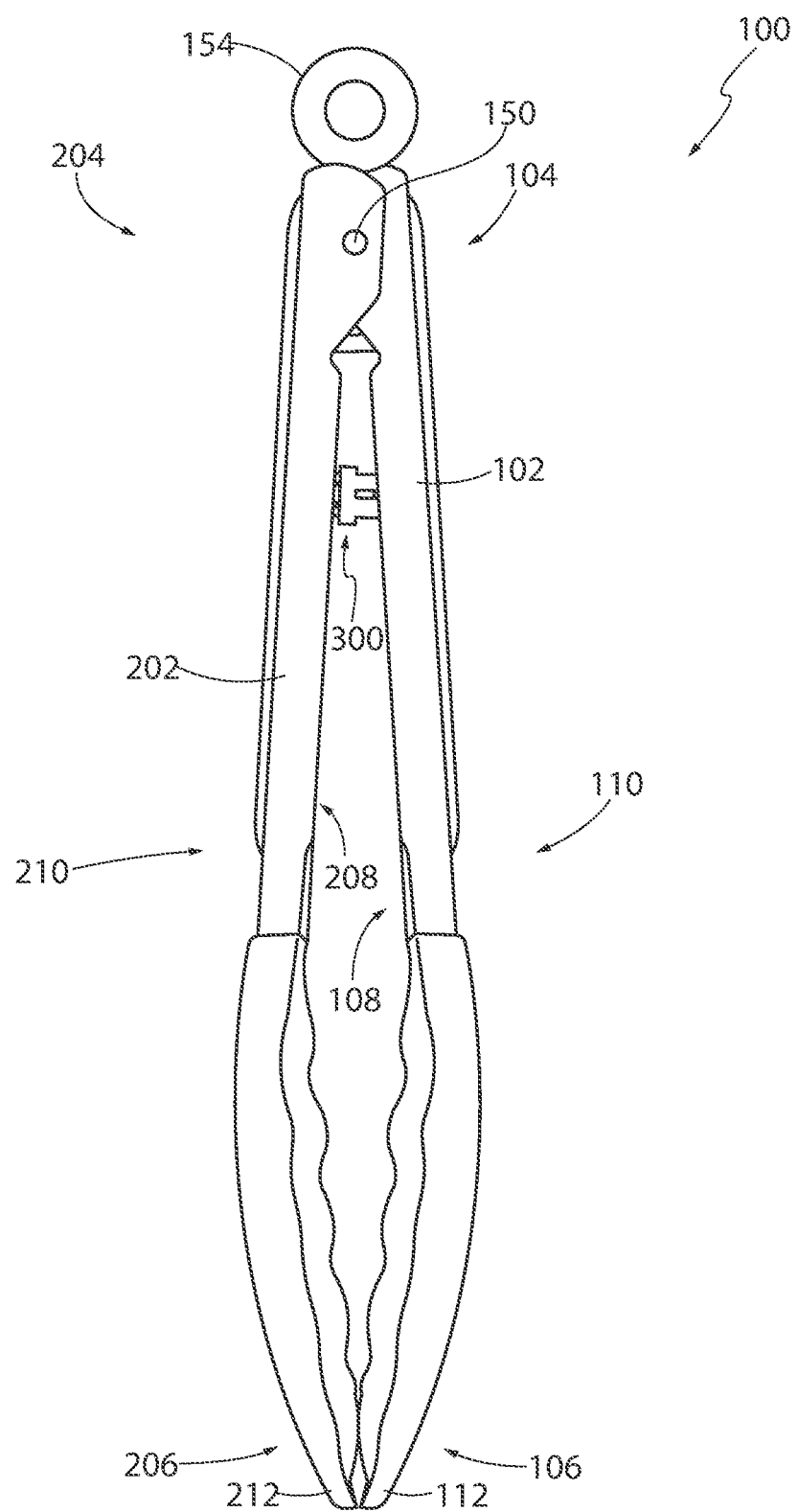
FIG. 3 shows the embodiment of FIG. 1 in the closed and locked configuration.
Figure 4:
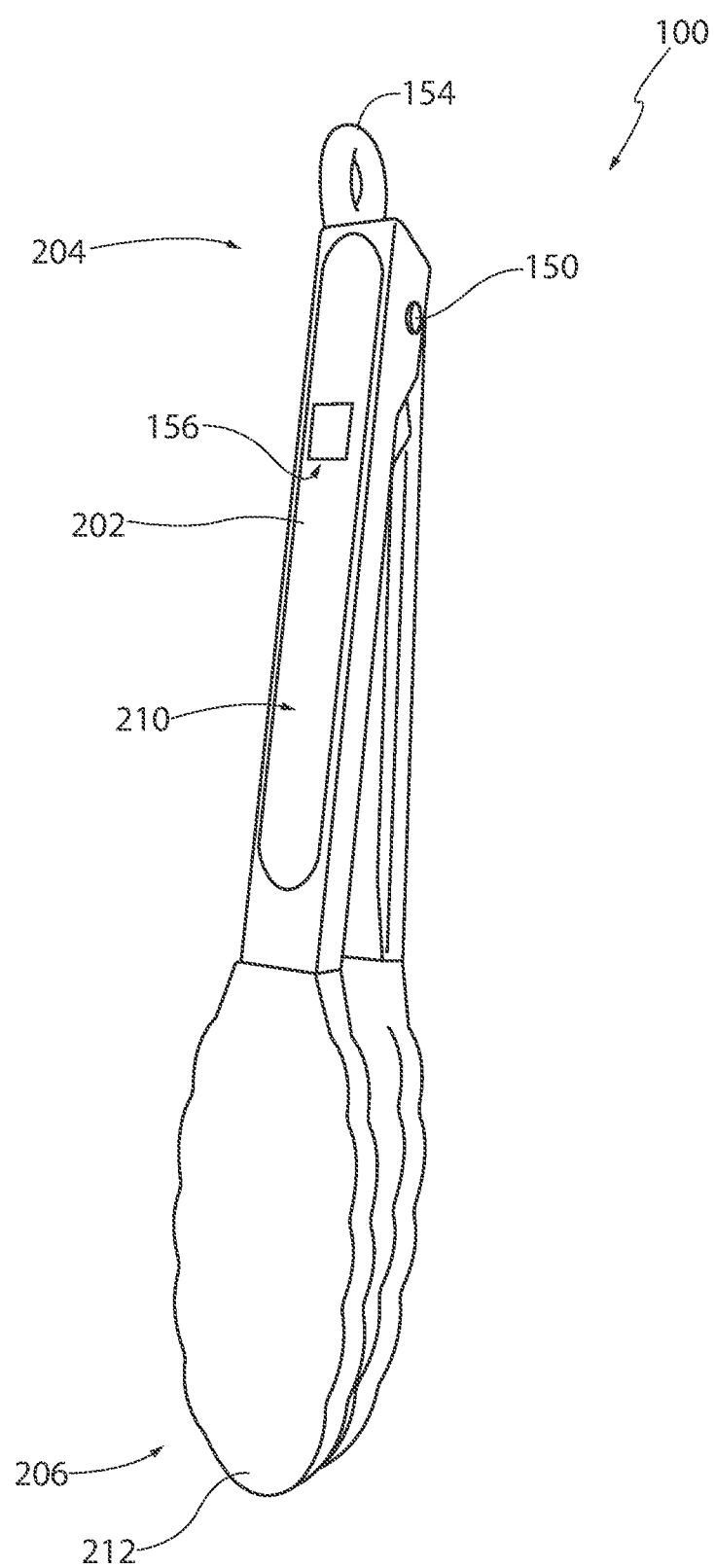
FIG. 4 shows a perspective view of an embodiment of the present invention.

The arms 102, 202 can be made of a rigid material, such as metal, plastic, wood, and the like. In the preferred embodiment, the arms 102, 202 are generally straight such that when the first distal end 106 touches the second distal end 206, the first arm 102 and the second arm 202 are substantially parallel as shown in FIGS. 3 and 4. For example, as measured at the proximal ends 104, 204, when the first distal end 106 is in contact with the second distal end 206, the firm arm 102 and the second arm 202 may form an angle of about 15 degrees or less. More preferably, the angle may be about 10 degrees or less. Most preferably, the angle may be about 5 degrees or less.

Figure 5:
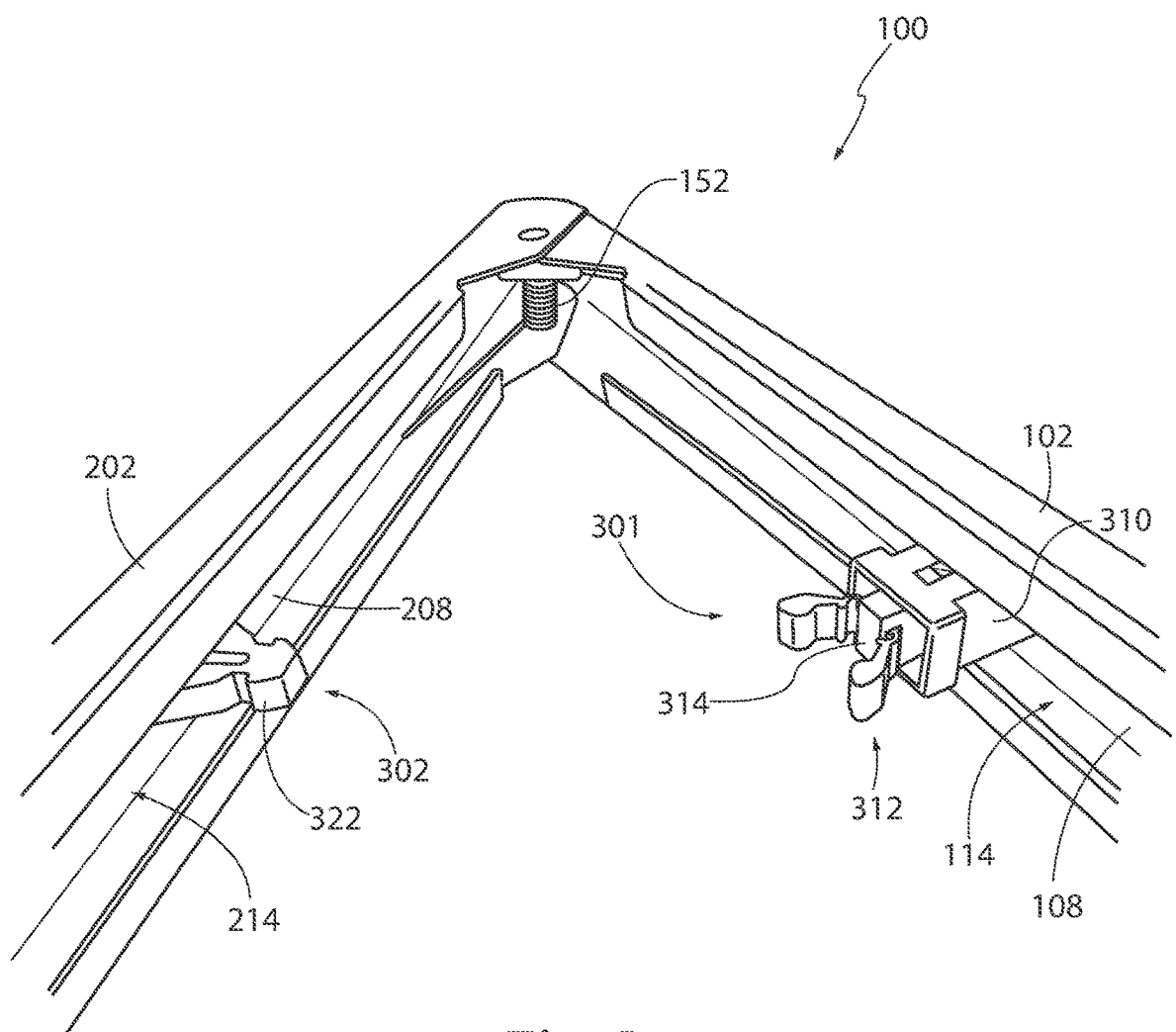
FIG. 5 shows a perspective view of a portion of an embodiment of the present invention from the interior side.

The first proximal end 104 of the first arm 102 and the second proximal end 204 of the second arm 202 are connected by a hinge 150. The hinge 150 allows the distal ends 106, 206 to move towards and away from each other to allow the user to pick up objects at the distal ends 106, 206. As shown in FIG. 5, a tong spring 152 can be placed at the hinge 150 imposing a biasing force against the first arm 102 and the second arm 202 causing the first distal end 106 to remain separated and distal from the second distal end 206 as shown in FIG. 1. In the preferred embodiment, the first distal end 106 can have a first flexible tip 112, and the second distal end 206 can have a second flexible tip 212. The flexible tips 112, 212 can be made of a durable yet flexible material, such as silicone, plastic, rubber, and the like.

The flexibility of the tips 112, 212 facilitates in the locking mechanism. Specifically, the lock 300 is mounted on the first arm 102 and the second arm 202 such that in order for the lock 300 to engage, the first arm 102 and the second arm 202 must be closer to each other than they are when the first flexible tip 112 just touches the second flexible tip 212. Thus, when the first flexible tip 112 just touches the second flexible tip 212, the first and second arms are not locked together. Rather, the arms 102, 202 must over-travel causing the flexible tips 112, 212 to bend slightly to allow the arms 102, 202 to come even closer to each other to allow the lock 300 to engage as shown in FIG. 3 and lock the arms 102, 202 together. This over-travel feature reduces the probability of the first and second arms 102, 202 inadvertently locking during regular use. In other words, when picking up a small or thin piece of material with the tongs 100, the user would not want the tongs 100 to lock inadvertently because the first arm 102 is too close to the second arm 202.

In embodiments with the flexible tips 112, 212, the first inner surface 108 of the first arm 102 can define a first channel 114, and the second inner surface 208 of the second arm 202 can define a second channel 214 as shown in FIG. 5. The first channel 114 and the second channel 214 provide depth for the first and second arms 102, respectively, to provide space to mount the first flexible tip 112 and second flexible tip 212 on to the first arm 102 and second arm 202, respectively.

In the preferred embodiment, the locking mechanism can be in the form of a latch 301 and strike 302, such as the grab catch sold by Grainger. The latch 301 can be mounted on the first inner surface 108 of the first arm 102. The strike 302 can be mounted on the second inner surface 208 of the second arm 202. The latch 301 and strike 302 are configured to connect to each other when the first arm 102 and the second arm 202 are adjacent to each other.

Figure 2:
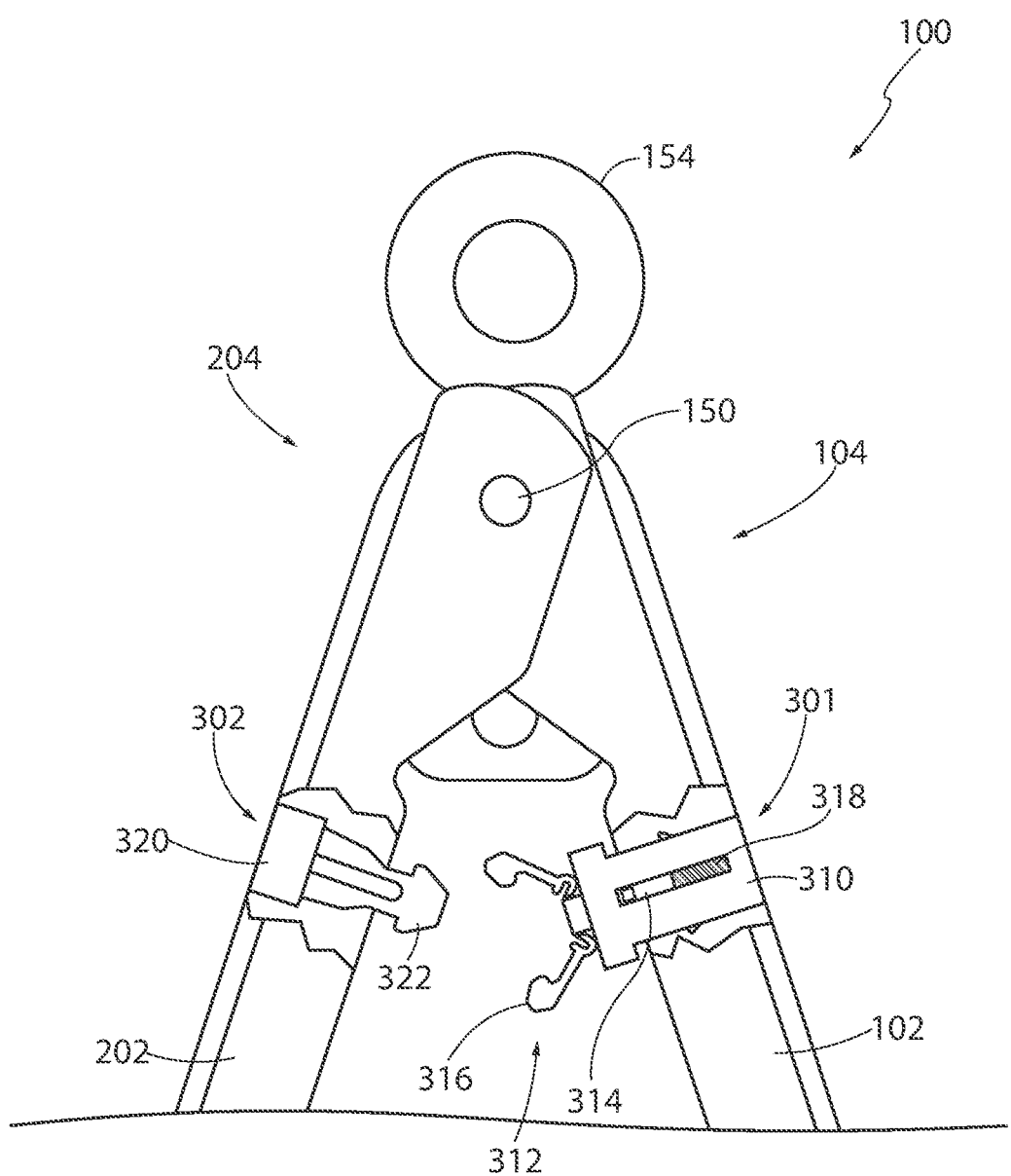
FIG. 2 shows a close up of an embodiment of the hinge and locking mechanism with a portion of the arms removed to see inside the arms.

In the preferred embodiment, the lock 300 comprises a latch 301 and a strike 302. In the engaged and locked configuration, the latch 301 receives and engages the strike 302 to prevent the strike from being removed from the latch. With reference to FIG. 2, the latch 301 can comprise a housing 310 mounted on the first inner surface 108 and a spring-loaded catch 312 mounted on the housing 310. The spring-loaded catch 312 can have a post 314 and a clasp 316 connected to the post 314. A spring 318 inside the housing can bias against the post 314.

The strike 302 can comprise a base 320 attached to the second inner surface 208 and a flanged head 322 opposite the base 320. The latch 301 and strike 302 are configured to connect to each other in a locked configuration when the first arm 102 and the second arm 202 are substantially parallel to each other. In the engaged and locked configuration, the flanged head 322 abuts against the post 314 with the clasp 316 surrounding the flanged head 322 as shown in FIG. 3.

In the preferred embodiment, when the strike 302 is pressed against the post 314 of the latch 301, the strike 302 pushes the post 314 deeper into the housing 310. When the post 314 descends into the housing 310 it draws the clasp 316 together causing the clasp 316 to close around the flanged head 322 as the clasp 316 and the flanged head 322 enter into the housing 310. Inside the housing 310 is a latch spring 318 abutting against the post 314 creating a biasing force against the post 314 to push the post 314 out of the housing 310. When the post 314 is pushed deep enough into the housing 310 an internal catch (not shown) locks the post 314 in place, and when the squeezing pressure is released, the arms 102, 202 are locked in place. Squeezing the arms 102, 202 again causes the internal catch to release and the latch spring 318 pushes the post 314 outwardly causing the clasp 316 to emerge from the housing 310 and open, which releases the strike 302, while the tong spring 152 causes the distal ends 106, 206 of the arms 102, 202 to separate.

In the preferred embodiment, the latch 301 and the strike 302 are positioned on the first and second arms 102, 202 in a manner that when in the locked configuration with the strike 302 engaged with the latch 301, the first distal end 106 touches the second distal end 206. In embodiments with the first and second flexible tips 112, 212, the first and second flexible tips 112, 212 are the distal ends 106, 206, and the first and second flexible tips 112, 212 touch each other in the locked configuration at their free ends.

In the preferred embodiment, in the locked configuration, the latch 301 and the strike 302 are entirely interior to the first outer surface 110 and the second outer surface 210. In this configuration, because the latch 301 and the strike 302 are located interiorly, the latch 301 and strike 302 are unlikely to be touched during normal use when the tong 100 is held in a natural and comfortable manner. When the tong 100 is handled naturally and properly, the user's hands only make contact with the first and second outer surfaces 110, 210 and the sides of the tong 100, and not the interior surfaces 108, 208. As such, unlike other tongs in which the locking mechanism is exposed on the exterior surface, the tong 100 of the present invention has no chance for the user to inadvertently disengage the lock 300 by inadvertently touching any part of the locking mechanism.

In the preferred embodiment, the latch 301 and the strike 312 are configured along the first and second arms 102, 202, respectively, to lock only when the first flexible tip 106 is compressed against the second flexible tip 206. In other words, just be the nature of the first flexible tip 106 touching the second flexible tip 206 is not sufficient to cause the latch 301 and the strike 302 to lock. Rather, sufficient squeezing force must be applied causing the first flexible tip 106 and the second flexible tip 206 to flex or bend away from each other before the latch 301 catches the strike 302. This configuration reduces the chances of the latch 301 catching the strike 302 during normal use when the user does not intend to lock the tong 100.

To facilitate locking the arms 102, 202 at the proper positioning, the latch 301 can reside inside the first channel 114, and the strike 302 can reside inside the second channel 214. Preferably, a portion of the latch 301 can protrude out from the first channel 114 directed interiorly towards the strike 302, and a portion of the strike 302 can protrude out from the second channel 214 directed interiorly towards the latch 301. Preferably, the portion of the latch 301 that protrudes out from the first channel 114 is at least the clasp 312, and the portion of the strike 302 that protrudes out from the second channel 214 is the flanged head 322. Because the latch 301 and the strike 302 protrude interiorly, no portion of the latch 301 or the strike 302 protrudes from the exterior surface of the arms 102, 202 where the locking mechanism can be accidentally dislodged.

In the preferred embodiment, the latch 301 and strike 302 are configured to disconnect from each other from the locked configuration when the first arm 102 and second arm 202 are squeezed towards each other. Therefore, if the user locks the tong 100 in the closed configuration and keeps the tong 100 in the user's hands, in order to unlock the arms 102, 202 while maintaining the same grip, the user simply has to squeeze the arms 102, 202 together a little closer and the latch 301 releases the strike 302. Thus, there is no need to shift the positioning of the hands on the tong 100, there is no need to look for a release button, there is no need for the user to use his or her opposite hand to release the lock, there is no need to change the orientation of the tong 100, and the like. The present invention allows the tong 100 to lock and unlock using only the natural movement for using a tong, namely, squeezing the arms 102, 202.

In the preferred embodiment, the latch 301 and the strike 302 are fixed along the first arm 102 and second arm 202, respectively. In some embodiments, the latch 301 and the strike 302 can be adjustable along the length of the first and second arms 102, 202. Stops may be placed at set positions along the first and second arms 102, 202 so that the latch 301 and the strike 302 can be properly aligned. In the preferred embodiment, the lock 300 is positioned towards the middle portion of the arms 102, 202. For example, the lock 300 may be positioned at least approximately 2 inches from the hinge 150 towards the distal ends 106, 206. In some embodiments, the lock 300 may be at least approximately 3 inches from the hinge 150 towards the distal ends 106, 206. In some embodiments, the lock 300 may be at least approximately 4 inches from the hinge 150 towards the distal ends 106, 206. In some embodiments, the lock 300 may be at least approximately 5 inches from the hinge 150 towards the distal ends 106, 206. In some embodiments, the lock 300 may be at least approximately 6 inches from the hinge 150 towards the distal ends 106, 206. In some embodiments, the lock 300 may be at least approximately 7 inches from the hinge 150 towards the distal ends 106, 206. For longer tongs 100, the lock 300 can be even farther away from the hinge 150 and closer to the distal ends 106, 206. The lock 300 can be fastened to the arms 102, 202 using any type of fastening mechanism, such as adhesives, screws, welding, tongue and groove, and the like. In some embodiments, an opening 156 may have to be created through the arms 102, 202 to accommodate the lock 300.

In some embodiments, the tong 100 can further comprise a secondary lock 154 adjacent to the joint 150 to assist in keeping the arms 102, 202 in the locked configuration. For example, if the user does not intend on using the tong 100 for a prolonged period of time, to reduce the stress of the tong spring 152 on the latch 301 and strike 302, the secondary lock 154 can be employed to keep the first arm 102 and second arm 202 together. The secondary lock 154 can prolong the life of the latch 301 and strike 302.

In use, the user uses the tong 100 as tongs are normally intended. When the user wants to lock the arms 102, 202 in place, the user squeezes the arms 102, 202 together compressing the first flexible tip 112 against the second flexible tip 212 to lock the latch 301 with the strike 302. To unlock the tong 100, without moving a position of any fingers on the first and second arms 102, 202, the user squeezes the first arm 102 towards the second arm 202 to release the latch 301 from the strike 302.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

INDUSTRIAL APPLICABILITY

This invention may be industrially applied to the development, manufacture, and use of tongs, generally used as a kitchen appliance for picking up and moving food items, in particular, in which two arms of the tong that can be locked together and subsequently unlocked with a single hand, without changing the grip on the tong, and without having to change the orientation of the tong, by utilizing a locking mechanism positioned on the arms of the tong in a manner that allows the lock to be actuated and released simply by the action of squeezing the arms together.

What is claimed is:

1. A tong, comprising:
   a) a first arm having a first proximal end, a first distal end opposite the first proximal end, a first inner surface in between the first proximal end and the first distal end, and a first outer surface opposite the first inner surface and in between the first proximal end and the first distal end, wherein the first distal end comprises a first flexible tip;
   b) a second arm having a second proximal end, a second distal end opposite the second proximal end, a second inner surface in between the second proximal end and the second distal end, and a second outer surface opposite the second inner surface and in between the second proximal end and the second distal end, wherein the second distal end comprises a second flexible tip, wherein the first proximal end and the second proximal end are connected by a hinge;
   c) a latch mounted on the first inner surface of the first arm; and
   d) a strike mounted on the second inner surface of the second arm, wherein the latch and strike are configured to connect to each other in a locked configuration when the first flexible tip is compressed against the second flexible tip, and wherein the latch and strike are configured to disconnect from each other from the locked configuration when the first arm is squeezed towards the second arm, wherein in the locked configuration, a flanged head of the strike abuts against a post of the latch with a clasp of the latch surrounding the flanged head inside a housing of the latch, wherein in the locked configuration, the first distal end touches the second distal end, wherein in the locked configuration the latch and the strike are entirely interior to the first outer surface and the second outer surface, wherein the latch and the strike are fixed along the first arm and second arm, respectively, wherein the first inner surface defines a first channel, and the second inner surface defines a second channel, wherein the latch resides in the first channel, and the strike resides in the second channel, wherein the clasp of the latch protrudes out from the first channel, and the flanged head of the strike protrudes out from the second channel.

2. A tong, comprising:
   a) a first arm having a first proximal end, a first distal end opposite the first proximal end, a first inner surface in between the first proximal end and the first distal end, and a first outer surface opposite the first inner surface and in between the first proximal end and the first distal end;

b) a second arm having a second proximal end, a second distal end opposite the second proximal end, a second inner surface in between the second proximal end and the second distal end, and a second outer surface opposite the second inner surface and in between the second proximal end and the second distal end, wherein the first proximal end and the second proximal end are connected by a hinge; and c) a lock configured to connect to the first arm and the second arm together when the first arm and the second arm are squeezed together, and wherein the lock is configured to disconnect the first arm and the second arm from each other when the first arm and the second arm are squeezed together, wherein the lock comprises a latch mounted on the first inner surface of the first arm and protruding away from the first arm towards the second arm; and a strike mounted on the second inner surface of the second arm and protruding away from the second arm towards the first arm, wherein the first distal end comprises a first flexible tip, and the second distal end comprises a second flexible tip, wherein the latch and the strike are configured to lock in a locked configuration when the first flexible tip is compressed against the second flexible tip, wherein in the locked configuration, the first distal end abuts against the second distal end, wherein the first inner surface defines a first channel, and the second inner surface defines a second channel, wherein the latch resides in the first channel, and the strike resides inside the second channel, wherein in the locked configuration the latch and the strike are entirely interior to the first outer surface and the second outer surface, wherein the latch and the strike are fixed along the first arm and second arm, respectively, wherein a portion of the latch protrudes out from the first channel, and a portion of the strike protrudes out from the second channel, and wherein the latch comprises a housing and a spring-loaded catch mounted inside the housing, wherein the spring-loaded catch comprises a post and a clasp connected to the post, wherein the strike comprises a base attached to the second inner surface and a flanged head opposite the base, wherein the latch and strike are configured to connect to each other in a locked configuration when the first arm and the second arm are substantially parallel to each other, wherein in the locked configuration, the flanged head abuts against the post with the clasp surrounding the flanged head inside the housing.

3. A method of using a tong, comprising:
a) providing a tong as recited in claim 1; and
b) using one hand, squeezing the first arm and the second arms toward each other until the lock locks the first arm to the second arm in the locked configuration.

4. The method of claim 3, wherein squeezing the first arm and the second arms toward each other until the lock locks the first arm to the second arm causes the first flexible tip to compress against the second flexible tip to lock the first arm with the second arm.

5. The method of claim 3, further comprising squeezing the first arm and the second arm towards each other to unlock the first arm from the second arm.

6. A method of using a tong, comprising:
a) providing a tong as recited in claim 2; and
b) using one hand, squeezing the first arm and the second arms toward each other until the lock locks the first arm to the second arm in the locked configuration.

7. The method of claim 6, further comprising squeezing the first arm and the second arm towards each other to unlock the first arm from the second arm.

8. The method of claim 6, wherein squeezing the first arm and the second arms toward each other until the lock locks the first arm to the second arm causes the first flexible tip to compress against the second flexible tip to lock the first arm with the second arm.

* * * * *